United States Patent Office 2,785,023
Patented Mar. 12, 1957

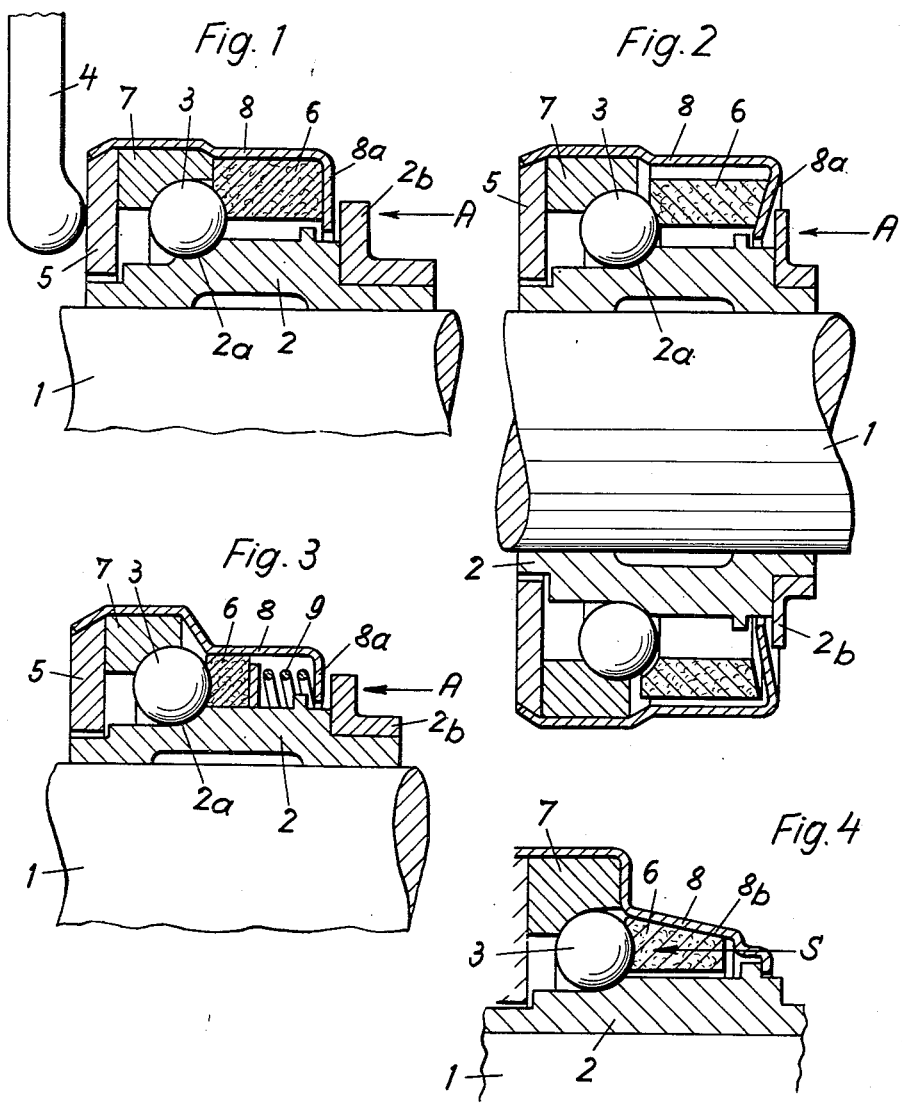

2,785,023

ANTI-FRICTION BEARINGS

Willy R. Naumann, Stuttgart-Degerloch, Germany, assignor to Daimler-Benz Aktiengesellschaft, Stuttgart-Unterturkheim, Germany Application March 2, 1954, Serial No. 413,670

Claims priority, application Germany March 4, 1953

7 Claims. (Cl. 308—187)

This invention relates to anti-friction bearings, and more specifically to clutch-release thrust bearings for the clutch release members of motor vehicle clutches.

Such clutch-release thrust bearings must be supplied with lubricant at all times, and normally they are therefore re-lubricated from time to time. In motor vehicles this is usually done at irregular intervals and more or less thoroughly by means of grease guns or by a centralized lubricating system. In connection with this, the bearings are very often supplied with an unnecessarily large amount of lubricant. This superfluous amount of lubricating oil and grease respectively, leaving at times the bearing already while the vehicle is being lubricated, or not until its operation, is not only wasted, but also has rather prejudical consequences, as it finds its way to the clutch facings and causes them to become oily and greasy.

One of the objects of the present invention is to overcome the above drawbacks by providing a clutch-release thrust bearing making such re-lubrication unnecessary.

Another object of the present invention is to provide such a lubrication for the clutch-release thrust bearings that they can do entirely without any maintenance.

A further object of the present invention is to provide a clutch-release thrust bearing which, notwithstanding the fact that re-lubrication is dispensed with, is capable of withstanding high thrust and radial loads and affords long-life service, in contrast to such graphited rings of plastic material which are also used as bearings at the present time. While such graphited plastic rings do not require any re-lubrication either, they are afflicted with the disadvantage that their rate of wear is excessive as compared with that of anti-friction bearings.

With these objects in view, the present invention comprises a clutch-release thrust bearing in which provision is made for a pressed part which is made of lubricant and in lubricating engagement with the balls of the clutch-release thrust bearing.

According to another feature of the invention, the pressed-lubricant part is of annular form, so that it runs essentially concentrically to the clutch-release thrust bearing and abuts against one of the front faces of the bearing races thereof.

The pressed-lubricant part is advantageously made of lubricant of such a high degree of consistency or viscosity that a creeping out of the lubricant from the bearing need not be feared. In addition, the continous play of the bearing to be lubricated effects that the balls thereof run again and again against the pressed-lubricant part and thus receive the necessary film of lubricant.

According to a further feature of the present invention, one of the races of the clutch-release thrust bearing is together with the pressed-lubricant part enclosed in a casing preferably made of sheet-metal.

According to further features of the present invention, the pressed-lubricant part is supported against conical surfaces of one of the races, so that an axial component of a force is produced by the weight of the pressed part or by the centrifugal force, which urge the pressed part against the balls of the bearing and thus lubricate them.

According to a still further feature of the present invention, the pressed-lubricant part is made of materials rendered from such constituents which ensure good bearing lubrication at a low rate of wear per shaft revolution.

Other objects and features of the present invention will become apparent from the following description taken in connection with the accompanying drawing which illustrates several embodiments of the invention, in which:

Figs. 1–4 are cross-sectional views illustrating several exemplifications of the invention:

Fig. 1 shows a bearing with a pressed-lubricant part rigidly mounted in the casing, Fig. 2 shows a bearing with a pressed-lubricant part freely mounted in the casing and being urged against the balls by the action of a gravity force, Fig. 3 shows a bearing with a pressed-lubricant part which is under spring tension, and Fig. 4 shows a bearing with a pressed-lubricant part urged axially against the balls by the action of centrifugal forces.

Referring now to the drawing it will be seen that the invention illustrated in Figs. 1–4 includes a shaft 1 on which is axially slidably mounted an inner race 2 having a bearing surface 2a on which balls 3 are mounted to run freely thereon. A thrust ring 2b will be under a thrust load in the direction of the arrow A when the clutch is thrown out. An outer race 7 of the anti-friction bearing is located between a supporting ring 5, against which a clutch-release lever 4 abuts, and an annular pressed-lubricant part 6; all three parts 5, 6 and 7 being held together by a casing 8, whose annular portion 8a extends in radial direction toward the inner race 2.

In the embodiment of the invention shown in Fig. 2, the casing portion 8a is angularly bent at a slant. The pressed-lubricant part 6 is freely mounted in the casing 8, and owing to its weight and to the slant of the casing portion 8a—and as it follows its own progressive wear—it abuts against the rollers 3 of the anti-friction bearing at all times.

In the form of the invention illustrated in Fig. 3, the pressed-lubricant part is under the tension of a spring 9.

In the construction of the invention shown in Fig. 4, the portion 8b of the casing 8 is tapered so as to effect that the rotating pressed-lubricant part 6 abuts against the balls 3 at all times. Centrifugal forces produce a thrust force S in axial direction.

It will be obvious that various modifications may be made in the embodiments above described without in any way departing from the spirit of the invention as defined in the appended claims.

What I claim is:

1. An anti-friction bearing comprising a shaft, an inner race, an outer race, a plurality of rolling members running in spaced relation with respect to each other between said two races, and a pressed-lubricant part made essentially of grease of high consistency or viscosity in abutting engagement with said rolling members and being formed as an annular element with an essentially concentric axis relative to the axis of said bearing, said outer race comprising an annular body provided with a bearing surface for said rolling members and a casing surrounding said annular body, said casing being angularly inwardly bent at a distance from said annular body so as to form a flange, said pressed-lubricant being accommodated between said flange and said annular body, said inner race being slidably supported on said shaft and provided with an outwardly directed flange on the side thereof adjacent said pressed-lubricant part, and said outer race including an inwardly directed annular flange adapted as support for a lever on the side of said rolling members opposite to that of said pressed-lubricant part.

2. An anti-friction bearing comprising an inner race, an outer race, a plurality of rolling members running in spaced relation with respect to each other between said two races, and a pressed-lubricant part made essentially of grease of high consistency or viscosity in abutting engagement with said rolling members and being formed as an annular element with an essentially concentric axis relative to the axis of said bearing, said outer race comprising an annular body provided with a bearing surface for said rolling members and a casing surrounding said annular body, said casing being angularly inwardly bent at a distance from said annular body so as to form a flange, said pressed-lubricant being accommodated between said flange and said annular body, said casing being made of sheet metal, and said outer race including an inwardly directed flange portion, said inwardly directed flange portion, said annular body, and said pressed-lubricant part being held together axially by said casing.

3. An anti-friction bearing comprising an inner race, an outer race, a plurality of rolling members running in spaced relation with respect to each other between said two races, and a pressed-lubricant part made essentially of grease of high consistency or viscosity in abutting engagement with said rolling members and formed as an annular element with an essentially concentric axis in relation to the axis of said bearing, said outer race having an inwardly directed flange and surrounding said pressed-lubricant part on the outside thereof, said pressed-lubricant part being mounted with axial play between said rolling members and said flange.

4. An anti-friction bearing comprising an inner race, an outer race, at least one ball member running between said two races, a pressed-lubricant part made essentially of grease of high consistency or viscosity and abutting against said ball member, and a resilient element for urging said pressed-lubricant part against said ball member.

5. An anti-friction bearing comprising an inner race, an outer race, a flange member connected to one of said two races, a plurality of rolling members running in spaced relation with respect to each other between said two races, and a pressed-lubricant part made essentially of grease of high consistency or viscosity in abutting engagement with said rolling members and formed as annular element with an essentially concentric axis in relation to the axis of said bearing, and resilient means between said flange and said pressed-lubricant part for urging the latter against said rolling members.

6. An anti-friction bearing comprising an inner race, an outer race, a plurality of rolling members running in spaced relation with respect to each other between said two races, and a pressed-lubricant part made essentially of grease of high consistency or viscosity in abutting engagement with said rolling members and formed as annular element with an essentially concentric axis in relation to the axis of said bearing, said outer race having an inwardly directed flange opposite said rolling members and surrounding said pressed-lubricant part on the outside thereof, said pressed-lubricant part being mounted with axial play between said rolling members and said flange, said flange extending conically toward said pressed-lubricant part, the latter being suspended between said rolling members and said conical flange.

7. An anti-friction bearing comprising an inner race, an outer race, a plurality of rolling members running in spaced relation with respect to each other between said two races, and a pressed-lubricant part made essentially of grease of high consistency or viscosity in abutting engagement with said rolling members and formed as annular element with an essentially concentric axis in relation to the axis of said bearing, said outer race surrounding said pressed-lubricant part radially on the outside thereof and being conically enlarged in a direction toward said rolling members such that said pressed-lubricant part is urged axially against said rolling members by the action of centrifugal forces.

References Cited in the file of this patent

UNITED STATES PATENTS

| | | |
|---|---|---|
| 638,158 | Woods | Nov. 28, 1899 |
| 1,201,328 | Moran | Oct. 17, 1916 |
| 2,387,602 | Murden | Oct. 23, 1945 |
| 2,457,537 | Douglass | Dec. 28, 1948 |